Dec. 12, 1944. H. J. SEAMAN 2,364,666
ROTARY TILLER
Filed Sept. 4, 1941 2 Sheets-Sheet 1

INVENTOR
HARRY J. SEAMAN
BY Christopher L. Waal
ATTORNEY

Dec. 12, 1944. H. J. SEAMAN 2,364,666
ROTARY TILLER
Filed Sept. 4, 1941 2 Sheets-Sheet 2
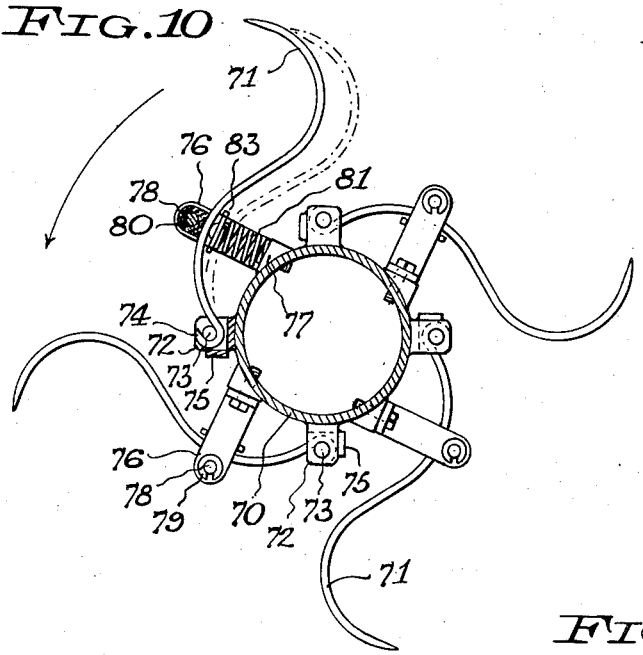
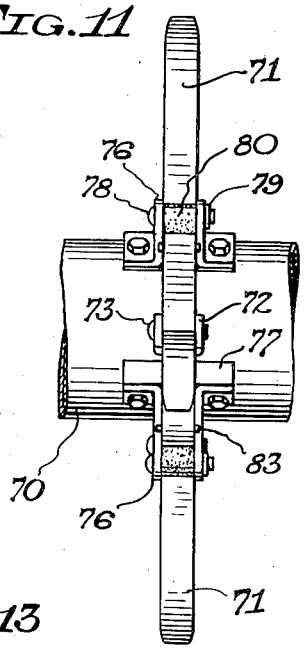
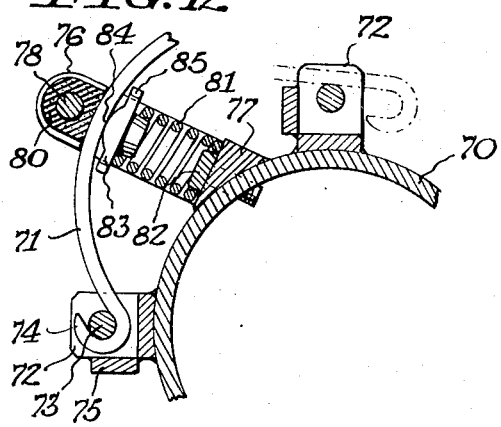
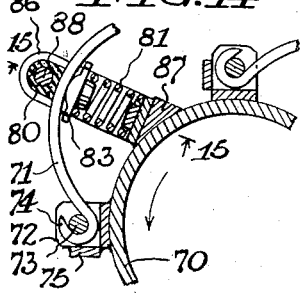
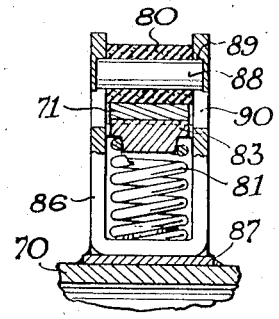
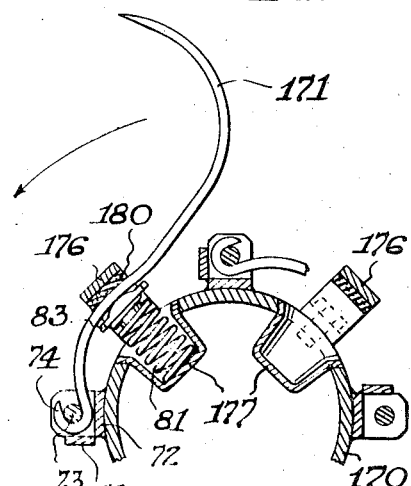
INVENTOR
HARRY J. SEAMAN
BY Christopher L. Waal
ATTORNEY Patented Dec. 12, 1944

2,364,666

UNITED STATES PATENT OFFICE 2,364,666

ROTARY TILLER

Harry J. Seaman, Milwaukee, Wis.

Application September 4, 1941, Serial No. 409,521

3 Claims. (Cl. 97—212)

The present invention relates to rotary tillers adapted for digging, pulverizing, mixing and otherwise working various materials, as in soil cultivation and road building.

An object of the invention is to provide an improved rotary tiller having simple but effective means for resiliently mounting a tool thereon and for permitting easy application and replacement of the tool.

Another object is to provide a rotary tiller which is so arranged as to prevent damage to the tool and other parts when the tool encounters excessive resistance to movement, as in striking stones or other obstructions in the soil.

A further object is to provide a rotary tiller which is of strong and durable construction and which can be inexpensively manufactured.

The invention further consists in the several features hereinafter described and claimed.

In the accompanying drawings, illustrating certain embodiments of the invention, Fig. 1 is a side elevation of one form of rotary tiller constructed in accordance with the invention, a driving shaft being shown in transverse cross-section, and a deflected position of one of the tools being shown in broken lines;

Fig. 10 is an elevation similar to Fig. 1, but illustrating a further modified form of device, parts being shown in section, and a deflected position of one of the tools being shown in broken lines;

Fig. 11 is another elevation of the device of Fig. 10 in a plane parallel to the axis of rotation;

Fig. 12 is a fragmentary detail side elevation of the rotary tiller of Fig. 10, parts being shown in section;

Fig. 13 is a detail perspective view of a spring follower for the device of Fig. 10;

Fig. 14 is a view similar to Fig. 12, showing still another modified form of rotary tiller;

Fig. 15 is a sectional view taken generally along the line 15—15 of Fig. 14, and Fig. 16 is another view similar to Fig. 12, showing an additional modification.

Figure 1:
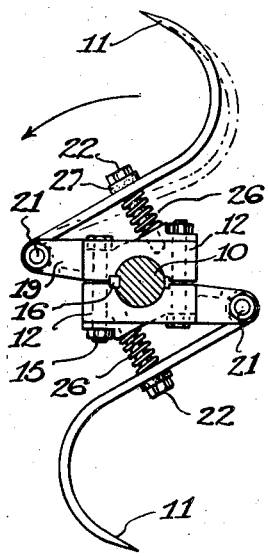
Figure 2:
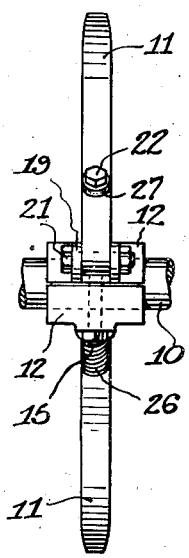
Fig. 2 is another elevation thereof in a plane parallel to the axis of rotation.
Figure 5:
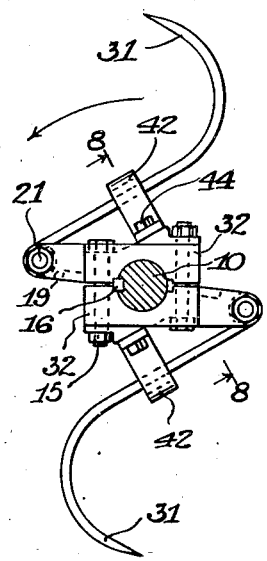
Fig. 5 is an elevation similar to Fig. 1, but showing a modified form of device.
Figure 6:
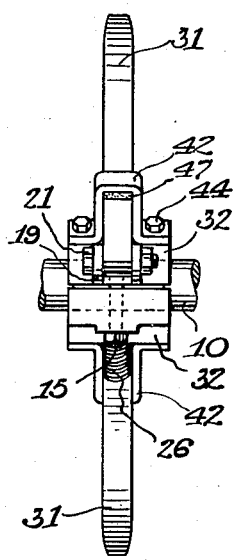
Fig. 6 is an elevation similar to Fig. 2, but showing the device of Fig. 5.

In the form of the invention shown in Figs. 1 to 4, 10 designates a rotary tiller shaft which is supported and driven in any suitable manner, the shaft being usually arranged in an approximately horizontal position and being movable over the soil or other material to be worked. The shaft carries thereon one or more tilling units (one being shown) each comprising one or more tines or tools 11, two diametrically opposite tools being shown in the present instance. The tools are in the form of curved or hooked metal bars, the inner ends of which are pivotally secured, as hereinafter described, to respective metal mounting members 12 carried on the shaft. Each mounting member has a channel 13 of generally semi-cylindrical shape to form a seat for the shaft, and has a pair of parallel bores 14 at opposite sides extending transversely of the channel to receive clamping bolts 15 by which the two mounting members are clamped to the shaft in opposed relation. The mounting members are held against relative rotation on the shaft in any suitable manner, as by a key 16 seated in the shaft and fitting in grooves or rabbets 17 formed in the mounting members along the edges of the semi-cylindrical channels 13. Each mounting member has a parallel-sided recess 18 in its outer face to receive and confine against rotation the head of the associated clamping bolt 15.

Spaced parallel ears or lugs 19 project from each mounting member transversely of the shaft axis and receive therebetween the eyed inner end 20 of the associated tool 11, the eyed tool end being pivotally secured to the ears by a pin or bolt 21 which is parallel to the shaft 10. The eyed pivot portion 20 of the tool is formed by bending a loop at the end of the tool. A bolt 22 passes through an opening 23 formed in the tool at a distance from the eye 20 and is detachably screw-threaded into an opening 24 formed in the mounting member, the bolt 22 preferably lying in the plane of the clamping bolts 15, and there being a spring seat 25 surrounding the opening 24. A coiled spring 26 surrounds the bolt 22 and extends between the spring seat 25 and the tool to resist rearward deflection of the tool. A resilient member 27, such as a rubber cushion washer or block, is interposed between the tool and the stop-forming head of the bolt. The coiled spring 26 is under compression and urges the tool forwardly and outwardly against the resilient member 27. The pivot bolt 21 is offset a substantial distance in the direction of rotation from a radial line extending from the shaft axis to the outer end of the curved tool, the direction of rotation being indicated by an arrow in Fig. 1. The outer end portion of the tool points in the direction of rotation, and lies approximately at right angles to a line extending from the axis of the pivot bolt 21 to the outer extremity of the tool. The eyed inner end 20 of each tool extends to a greater radius from the shaft than the head of the bolt 22.

Each pivoted tool is deflectable inwardly against the pressure of the compressed or preloaded spring 26, as to the broken line position of Fig. 1. This inward deflection occurs when the tilling device encounters substantial resistance in its passage through the soil or other material being worked, as when striking a stone or other obstruction, thus reducing the effective radius of the tool and easing the stress on the tool so as to prevent breakage of the tool. The yielding of the tool also reduces the stress on other parts of the mechanism. The tool itself is fairly rigid, although it may have some degree of resilience, if desired. By reason of the preloading of the spring 26, the tool will have but little deflection until the working pressure thereon exceeds a predetermined amount. The preloading of the spring also permits the use of a much lighter spring than would otherwise be required, and minimizes play and wear at the pivot bolt. The effective working depth of the tilling device is a substantial part of the tool radius. By removing the bolts 21 and 22 worn tools can readily be replaced, and tools of various types can be applied to suit the work at hand.

The mounting members rigidly carried on the shaft constitute therewith a rotatable member. The ears 19 and spring seats 25 are preferably formed on the mounting members, as shown, but in some instances these parts may be formed directly on the shaft.

In operation, the tilling device is rotated at a suitable speed, causing the hooked, self-sharpening tools to enter and pulverize the soil or other material. In some cases, as in manuring and road building, the tilling device will also have a mixing action. Upon encountering heavy resistance, as in striking stones or other obstructions, the pivoted tools will yield or deflect inwardly against the pressure of the springs 26, thus reducing the stress on the tools and other parts. The return travel of the deflected tools to their normal position will be cushioned by the resilient washers or blocks 27, thereby avoiding sharp blows on the tools.

In the modified form of tilling device shown in Figs. 5 to 8, the rotary tilling shaft 10 carries opposed mounting members 32 which are generally similar to the mounting members 12 of Fig. 1, and are secured in the same manner. Tools 31, generally similar to the tools 11, being formed of flat metal bar stock, are pivotally secured to the mounting members as in the device of Fig. 1. Each tool passes through a stop-forming yoke or stirrup 42 which is detachably secured to the associated mounting member by screws 44. A compressed coiled spring 26 is interposed between the tool and a spring seat 45 formed on the mounting member, the spring seat being provided with a spring-centering knob 46. The tool may be provided with a similar knob. The spring is confined in a protected position between the spaced side portions of the stirrup. A resilient member 47, such as a rubber cushion block, is interposed between the tool and the outer end of the stirrup and is secured to either the stirrup or the tool. The spring can be mounted in place either before or after the stirrup is attached to the mounting member. In the latter case, the spring is compressed to permit its insertion and removal. By the use of the stirrup or similar stop member it is possible to mount the spring without requiring a bolt opening in the tool. The tool may be replaced without detaching the stirrup, as the tool is capable of insertion through the stirrup opening. The operation of the tilling device of Figs. 5 to 8 is similar to that of the device of Figs. 1 to 4.

Figure 3:
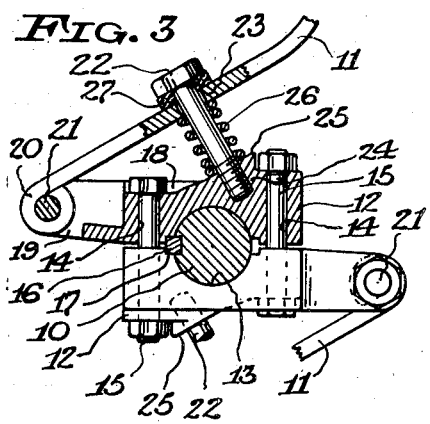
Fig. 3 is a fragmentary detail side elevation of the rotary tiller on an enlarged scale, parts being shown in section.
Figure 7:
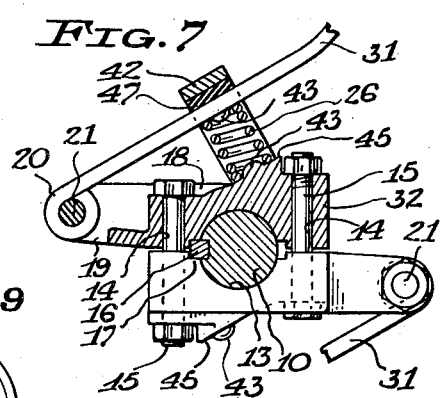
Fig. 7 is a fragmentary detail side elevation of the rotary tiller of Fig. 5, parts being shown in section.
Figure 9:
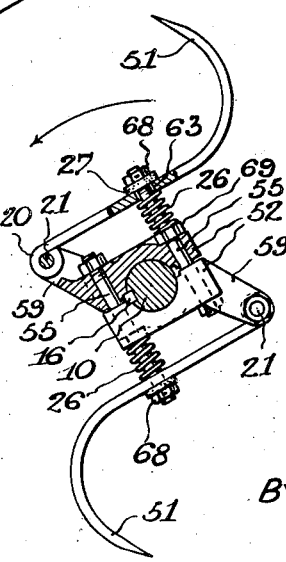
Fig. 9 is an elevation similar to Fig. 1, but illustrating another modified form of device, parts being shown in section.
Figure 4:
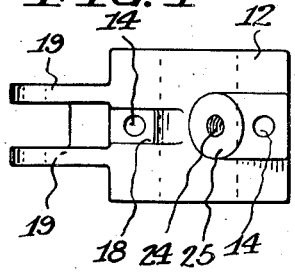
Fig. 4 is a plan view of a holder or carrier for one of the tools.
Figure 8:
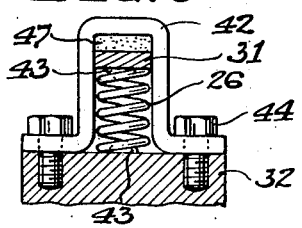
Fig. 8 is a detail sectional view taken generally along the line 8—8 of Fig. 5.

In the modified form of tilling device shown in Fig. 9 the rotary tilling shaft 10 carries opposed mounting members 52 which are generally similar to the mounting members 12 of Fig. 1, and are secured in the same manner by clamping bolts 55. Tools 51, generally similar to the tools 11, are pivotally secured to spaced ears 59 on the mounting members in the manner of the device of Fig. 1. An extended end portion of each clamping bolt 55 takes the place of the bolt 22 of Fig. 1 and passes through an opening 63 in the tool, and a stop nut 68 is placed on the outer end of the bolt. A compressed coiled spring 26 surrounds the bolt extension and is interposed between the tool and a nut or other enlargement 69 on the bolt. A resilient member 27, like that of Fig. 3, is interposed between the tool and the stop nut 68. The operation of the tilling device of Fig. 9 is similar to that of Fig. 1.

The modified form of tilling device shown in Figs. 10 to 13 includes a hollow rotatable tilling shaft 70 on which tools 71, generally similar to the tools 11, are resiliently mounted. Peripherally spaced U-shaped clips or brackets 72 are welded or otherwise rigidly secured to the shaft and carry respective pivot pins 73 which extend in parallel relation to the axis of the shaft. The tools have hooked inner ends 74 which detachably and pivotally engage the pins, and the brackets are preferably provided with retainer-forming cross bars 75 to confine the hooked tool ends. Each tool passes through a stop-forming yoke or stirrup 76, the base portion of which is rigidly bolted or welded to the hollow shaft. A block 77 is welded to the shaft to form a spring seat member and is interposed between the shaft and the base portion of the stirrup. The outer end of the stirrup is formed by a headed stop pin 78 which is detachably held in place in any suitable manner, as by means of a forked snap washer 79 engaging a peripherally grooved end portion of the pin. The stop pin carries a cushion 80, such as a sleeve of rubber or other suitable material, to form an abutment for the tool. A compressed coiled spring 81 is interposed between the tool and the spring seat member 77 to resist rearward deflection of the tool and to normally urge the tool against the cushion 80. The spring seat member 77 is provided with a spring-centering embossment 82, and the outer end of the spring is seated against a follower 83 which has a cylindrically rounded outer surface 84 rockably bearing against the tool. If desired, the follower may have guide lugs 85 slidably engageable with the side portions of the stirrup 76 to prevent rotation and lateral shifting of the follower.

The operation of the rotary tiller of Figs. 10 to 13 is generally similar to that of the device of Figs. 5 to 8, the tools being yieldable rearwardly and inwardly upon encountering excessive resistance to movement. During operation the working pressure against the outer end of the tools maintains the hooked inner end of the tools against the pivot pins. When tools are to be replaced, the stirrup pins 78 are detached and the hooked ends of the tools are removed and applied by placing the tools in the dotted line position of Fig. 12, it being unnecessary to remove the pivot pins.

The modified form of tilling device shown in Figs. 14 and 15 is generally similar to that of Figs. 10 to 13, and includes a stop-forming yoke or stirrup 86 in the form of a U-shaped bracket the base portion of which is welded or otherwise rigidly secured to a spring seat member 87 carried on the shaft. The outer ends of the bracket carries a stop pin 88 the ends of which are normally seated in pockets 89 formed in the bracket to prevent axial shifting of the pin. Each stop pin carries a cushion sleeve 90 of rubber or other suitable material, and each tool is pivotally mounted and spring loaded, as in the device of Figs. 10 to 13. The pockets 89 in the bracket communicate with openings 90 formed in the bracket and offset toward the base portion, so as to permit insertion and removal of the stop pin. When it is desired to replace a tool, the tool is forced rearwardly and inwardly against the action of the spring to permit the stop pin to register with the openings 90, and thus allow withdrawal of the pin. The tool may then be swung outwardly beyond the stirrup.

In the modification shown in Fig. 16, which is generally similar to that of Figs. 10 to 13, the hollow shaft 170 is provided with inset radial cups 177 welded or otherwise rigidly secured in place. These cups open outwardly and form pockets to receive the coiled springs 81 which act on tools 171 pivotally carried by the shaft as in the device of Fig. 10. The forward movement of the tools is limited by yokes or stirrups 176 provided with respective cushions 180, these stirrups being similar to the stirrups 42 of the device of Fig. 5 and being detachably secured to the shaft.

Certain embodiments of the invention have been shown and described, but it will be obvious to those skilled in the art that modifications may be made without departing from the spirit and scope of the invention.

What I claim as new and desire to secure by Letters Patent is:

1. In a rotary tiller, the combination of a rotatable member having a pivot member, a tool projecting outwardly from said rotatable member and having an open hook at its inner end detachably engageable with said pivot member and normally retained against said pivot member by working pressure on said tool, and resilient means for yieldably resisting rearward pivotal movement of said tool, the free extremity of said hooked tool end being normally at the outer side of said pivot member, and said tool being swingable on said pivot member in a forward direction beyond its normal position to place said free extremity of the open hooked tool end at the inner side of said pivot member and thereby permit detachment of said hooked end from said pivot member by longitudinal displacement of the tool.

2. In a rotary tiller, the combination of a rotatable member, a tool projecting outwardly from said member and pivotally carried by said member to swing in a forward and rearward direction, a compressible coiled spring carried by said member for resisting rearward deflection of said tool, a spring follower interposed between said spring and tool and rockably bearing on said tool, and a stop stirrup secured to said rotatable member for limiting the forward swinging travel of said tool with respect to said rotatable member, said stirrup having spaced side portions for limiting lateral shifting of said follower.

3. In a rotary tiller, the combination of a rotatable member having a pivot member, a tool projecting outwardly from said rotatable member and having an open hook at its inner end detachably engageable with said pivot member, the free extremity of said hooked tool end being normally at the outer side of said pivot member, a retaining member on said rotatable member forming an abutment preventing disengagement of said hooked tool end from said pivot member when said tool member is in normal position, said open hooked end being normally confined between said pivot member and retaining member, and resilient means for yieldably resisting rearward pivotal movement of said tool, said tool being swingable on said pivot member in a forward direction beyond its normal position to place said free extremity of the open hooked tool end at the inner side of said pivot member and thereby permit detachment of said hooked end from said pivot member by longitudinal displacement of the tool.

HARRY J. SEAMAN.